US011875953B2

(12) United States Patent
Andreyo et al.

(10) Patent No.: US 11,875,953 B2
(45) Date of Patent: Jan. 16, 2024

(54) CALIBRATION JOINT FOR A THREE-PHASE ELECTRIC DISCONNECT SWITCH

(71) Applicant: Southern States, LLC, Hampton, GA (US)

(72) Inventors: Joseph Andreyo, Fayetteville, GA (US); Juan Camilo Gill-Gaviria, Alpharetta, GA (US)

(73) Assignee: SOUTHERN STATES LLC, Hampton, GA (US)

( * ) Notice: Subject to any disclaimer, the term of this patent is extended or adjusted under 35 U.S.C. 154(b) by 0 days.

(21) Appl. No.: 17/699,216

(22) Filed: Mar. 21, 2022

(65) Prior Publication Data

US 2023/0298828 A1 Sep. 21, 2023

(51) Int. Cl.
*H01H 3/02* (2006.01)

(52) U.S. Cl.
CPC .................................... *H01H 3/02* (2013.01)

(58) Field of Classification Search
CPC ........ H01H 31/04; H01H 31/02; H01H 15/24; H01H 3/02; H01R 13/62; F16L 21/06
USPC .......................... 200/48 A, 336, 48 R–48 CB
See application file for complete search history.

(56) References Cited

U.S. PATENT DOCUMENTS

| | | | | |
|---|---|---|---|---|
| 5,483,030 A * | 1/1996 | Bridges | H01H 33/126 | 218/20 |
| 6,459,053 B1 * | 10/2002 | Roberts | H01H 33/42 | 200/48 R |
| 2012/0025524 A1 * | 2/2012 | Krausz | F16L 21/08 | 285/420 |
| 2020/0103062 A1 * | 4/2020 | Belen | F16L 21/065 | |

* cited by examiner

*Primary Examiner* — Edwin A. Leon
*Assistant Examiner* — Iman Malakooti
(74) *Attorney, Agent, or Firm* — MEHRMAN LAW OFFICE; Michael J. Mehrman

(57) ABSTRACT

A calibration joint for a three-phase electric disconnect switch includes a linkage pipe extending through a lock ring, which includes an axial guide shaft, a threaded shaft, and a self-piercing set screw securing the lock ring to the linkage pipe. The linkage pipe also extends through a clevis housing, which includes an axial joiner shaft and a clevis bracket securing the clevis housing to an operating lever of the disconnect switch. An adjustment rod extending through the axial guide shaft of the lock ring, through the axial joiner shaft of the clevis housing, and engaging with lock nuts allows axial adjustment of the clevis housing with respect to the lock ring, and thus with respect to the linkage pipe. This, in turn, allows fine adjustment of the blade and jaws of an associated phase switch with respect to the switch actuator independent of the other phase switches.

10 Claims, 7 Drawing Sheets

CALIBRATION JOINT FOR A THREE-PHASE ELECTRIC DISCONNECT SWITCH

TECHNICAL FIELD

The present invention relates to high-voltage electric switchgear and, more particularly, to a calibration joint for a three-phase electric disconnect switch allowing fine adjustment of the blade and jaws of an associated phase switch with respect to the switch actuator independent of the other phase switches.

BACKGROUND

FIG. 1A (prior art) is a conceptual illustration of a conventional three-phase disconnect switch 10 in the open switch position. FIG. 1B (prior art) shows the switch 10 in the closed switch position. The switch 10 includes three sets of rotating insulators 11*a*1-11*a*2, 11*b*1-11*b*2 and 11*c*1-11*c*2, one set for each electric power phase, Phase-A, Phase-B and Phase-C. The insulators 11*a*1, 11*b*1 and 11*c*1 carry a jaws 12*a*, 12*b* and 12*c*, respectively, while the insulators 11*a*2, 11*b*2 and 11*c*2 carry a blade 13*a*, 13*b* and 13*c*, respectively. FIG. 1A shows the disconnect switch 10 in the open switch position, in which the jaws 12*a*, 12*b* and 12*c* are not in electrical contact with their corresponding blades 13*a*, 13*b* and 13*c*. The rotating insulators 11*a*1-11*a*2, 11*b*1-11*b*2 and 11*c*1-11*c*2 are each configured to rotate to bring the jaws 12*a*, 12*b* and 12*c* into electrical contact with their respective blades 13*a*, 13*b* and 13*c*. When the switch 10 is in the fully closed switch position, the blades 13*a*, 13*b* and 13*c* must be properly seated in their respective jaws 12*a*, 12*b* and 12*c* to avoid damaging arcing in the switch connections.

The switch 10 includes a motor-driven or hand-driven actuator, not shown in the figures, for a moving a drive pipe 14 to simultaneously rotate the insulators 11*a*1-11*a*2, 11*b*1-11*b*2 and 11*c*1-11*c*2 to open and close the switch. A conventional linkage 15 connects the drive pipe 14 to the insulators allowing the single drive pipe to rotate all six insulators. The conventional linkage 15 includes a linkage pipe 16 connecting the drive pipe 14 through a series of mechanical connections to phase operating levers 18*a*, 18*b* and 18*c*, one for each electric power phase. The connecting rod 19*a* connects the phase operating lever 18*a* to both rotating insulators 11*a*1-11*c*2 for Phase-A, the connecting rod 19*b* connects the phase operating lever 18*b* both rotating insulators 11*b*1-11*b*2 for Phase-B, and the connecting rod 19*c* connects the phase operating lever 18*c* to both rotating insulators 11*c*1-11*c*2 for Phase-C.

The conventional linkage 15 includes a first clevis joint 17*a* at the junction between the linkage pipe 16 and the phase operating lever 18*a* for Phase-A, a second clevis joint 17*b* at the junction between the linkage pipe 16 and the phase operating lever 18*b* for Phase-B, and a third clevis joint 17*c* at the junction between the linkage pipe 16 and the phase operating lever 18*c* for Phase-C. In this particular example, the conventional linkage 15 also includes a fourth clevis joint 17*d* at the junction between the drive pipe 14 and the phase operating lever 18*b* for Phase-B. In other embodiments, the drive pipe may be connected to Phase-A, Phase-B or Phase-C as a matter of design choice. In addition, in this particular example, the drive pipe 14 is shown to be parallel to the linkage pipe 16. In other embodiments, the drive pipe 14 may be positioned at different angles with respect to the linkage pipe 16 as a matter of design choice.

While the conventional three-phase disconnect switch 10 has served the industry well for decades, it experiences a significant drawback when initially setting up the conventional linkage for the fully closed switch position, which requires precise mechanical calibration. Each of pair of rotating insulators is mechanically fixed to a separate frame, which can result in slight differences in the relative positions of each insulator to the other insulators and to the linkage. The linkage must be calibrated precisely to ensure that each insulator rotates fully so that each blade seats properly within its respective jaws to properly close each phase of the switch. Calibrating the entire linkage is a painstaking process because multiple calibration points have to be manually adjusted. Each linkage pipe typically has its own length adjustment mechanism and changing the length or position of one piece of the linkage can impact the other parts of the linkage. As the relative angles between the linkage pipes and the rotating insulators is critical to the proper operation of the switch, setting the linkage to achieve the correct rotational angles of all six insulators requires multiple measurements and length adjustments. This frequently requires multiple trial-and-error adjustments to achieve the correct calibration. The process has been likened to tuning a piano, where adjustment of each string impacts the notes produced by the other strings.

The electric power industry therefore has a continuing need for improved linkage techniques for three-phase disconnect switches.

SUMMARY

The problem described above is mitigated by a calibration joint for a three-phase electric disconnect switch. A linkage pipe extends through a collar of a lock ring, which includes an axial guide shaft, a threaded shaft, and a self-piercing set screw securing the lock ring to the linkage pipe. The linkage pipe also extends through a clevis housing, which includes an axial joiner shaft and a clevis bracket securing the clevis housing to an operating lever of the disconnect switch. An adjustment rod extends through the axial guide shaft of the lock ring, through the axial joiner shaft of the clevis housing, and engages with lock nuts allows axial adjustment of the clevis housing with respect to the lock ring, to allow rotational adjustment of an insulator of the disconnect switch with respect to an axial position of the linkage pipe. This, in turn, allows fine adjustment of the blade and jaws of an associated phase switch with respect to the switch actuator independent of the other phase switches.

It will be understood that specific embodiments may include a variety of features in different combinations, and that all of the features described in this disclosure, or any particular set of features, needs to be included in particular embodiments. The specific techniques and structures for implementing particular embodiments of the invention and accomplishing the associated advantages will become apparent from the following detailed description of the embodiments and the appended drawings and claims.

BRIEF DESCRIPTION OF THE FIGURES

The numerous advantages of the invention may be better understood with reference to the accompanying figures in which.

DESCRIPTION OF ILLUSTRATIVE EMBODIMENTS

The problem described above is mitigated by a calibration joint for a linkage utilized in a three-phase electric disconnect switch, which allows fine adjustment of the blade and jaws of an associated phase switch with respect to the switch actuator independent of the other phase switches. Previous and current designs three-phase linkage arrangements use a sliding clevis captured on a long pipe. The axial position of the clevis along the pipe is adjusted in small increments using a small impact device or hammer to "tap" the clevis into position. This type of axial adjustment is difficult to perform precisely and typically requires a series of trial and error adjustments. The process is often not performed well, particularly by technicians with limited experience, and an improperly positioned clevis can cause the switch to malfunction. Some linkage adjustment designs address this issue by having linkage pipes with in-line turnbuckles to facilitate minor changes in the axial position of the clevis. However, this type of linkage requires a number of extra pieces and frequently requires shipping replacement pipes cut to specific lengths to the field when installation variations go beyond the adjustment range of this linkage.

This improved calibration joint provides a simple and sturdy mechanism for fine adjustment of the axial position of the clevis with the advantage of having multiple calibration joints carried on a common longer linkage pipe as opposed to multiple shorter linkage pipes connected together with in-line turnbuckles. The longer linkage pipe carrying multiple calibration joints is less expensive and eliminates the need for multiple linkage pipes with shorter, often different lengths, which may not be immediately available when needed in the field.

The calibration joint itself is not tied to any particular switch configuration and may be employed with any suitable three-phase linkage. In the illustrative embodiments, drive levers and operating levers are examples of linkage levers used in disconnect switches. The calibration joint is not limited to these specific types of levers, but may be connected to any suitable type of linkage lever in the three-phase linage assembly. In addition, although adjustment bolts are shown in the illustrative embodiments, it will be appreciated that threaded rods with end nuts may be utilized as a matter of design choice.

Figure 1A:
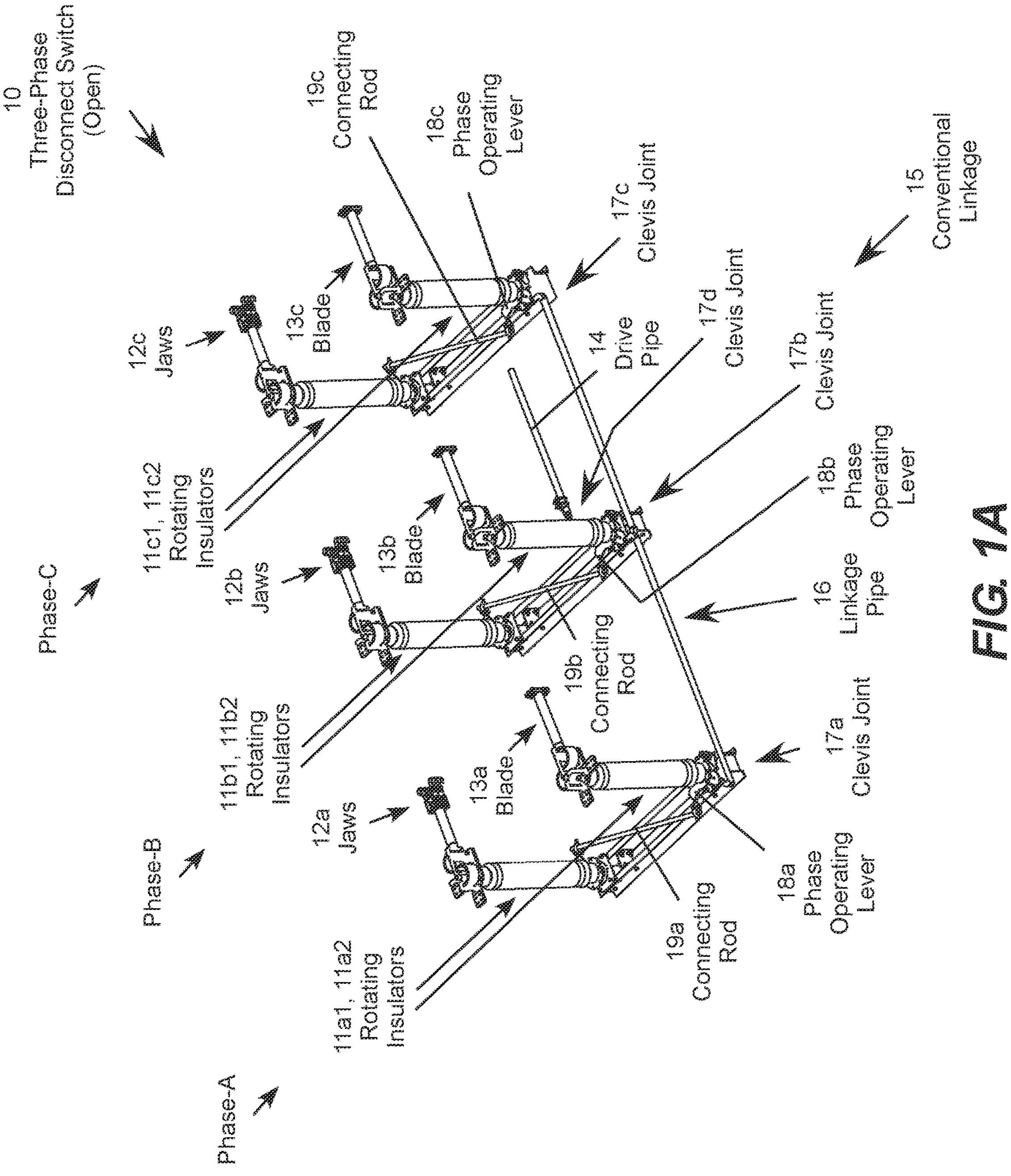
FIG. 1A (Prior Art)
FIG. 1A (prior art) is a conceptual perspective conceptual illustration of a conventional three-phase disconnect switch in the open position.
Figure 1B:
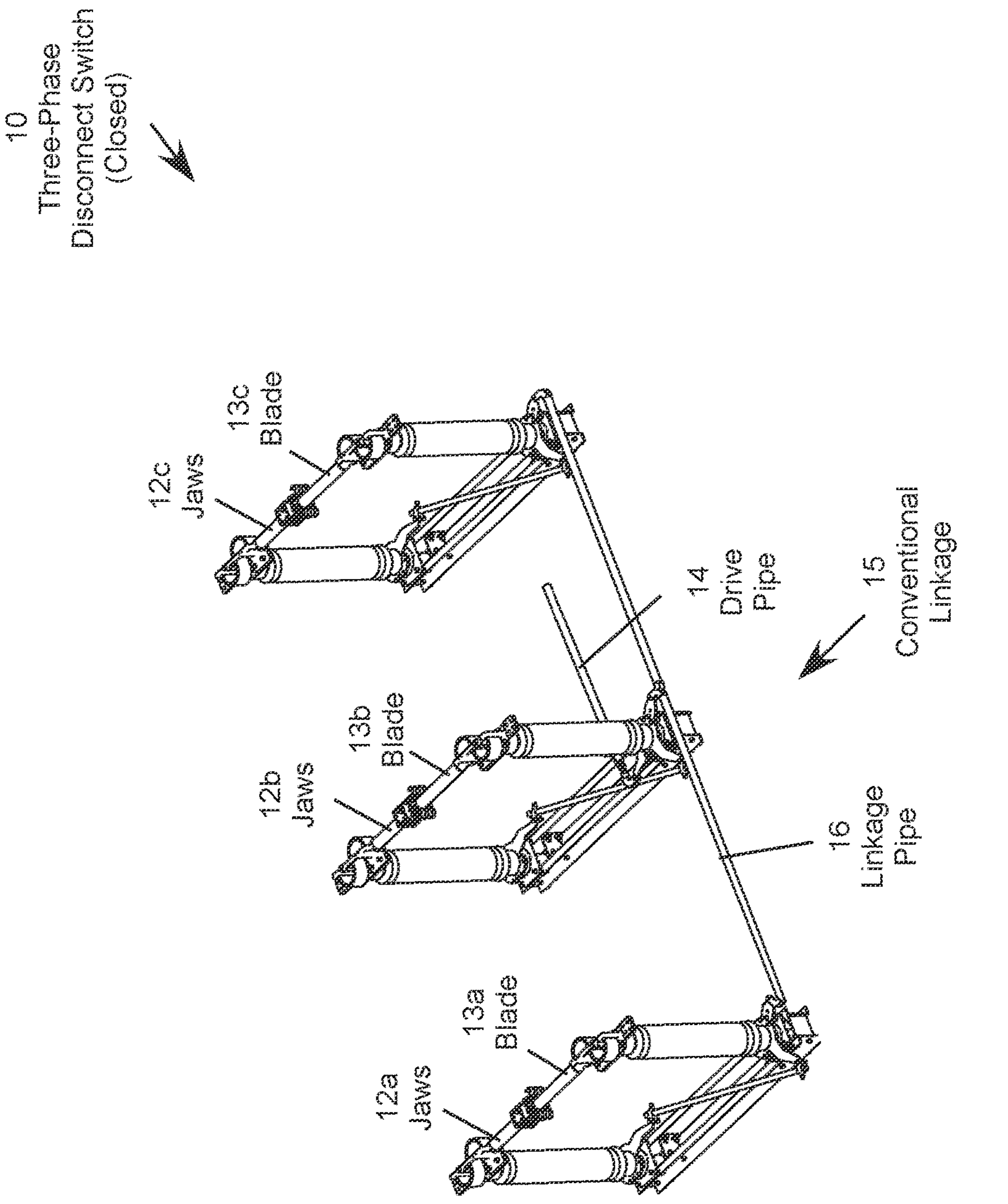
FIG. 1B (Prior Art)
FIG. 1B (prior art) is a conceptual perspective conceptual illustration of the conventional three-phase disconnect switch in the closed position.
Figure 2:
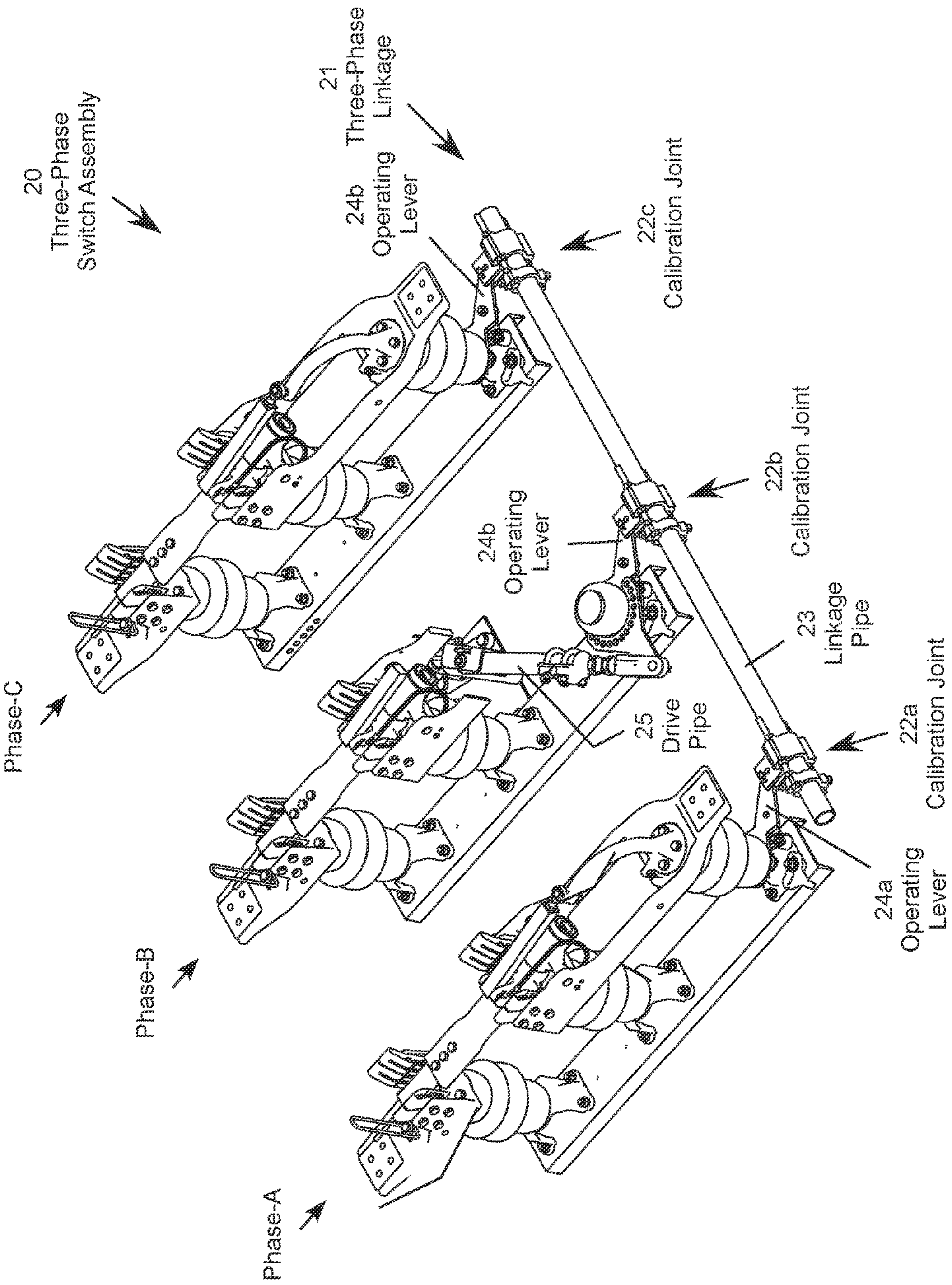
FIG. 2 is a perspective conceptual illustration of a representative three-phase switch assembly including three calibration joints.

FIG. 2 shows a representative three-phase disconnect switch 20 including a three-phase linkage 21 with three calibration joints 22*a*-22*c*. The disconnect switch 20 serves a similar function as the conventional switch described with reference to FIGS. 1 and 2, except that the conventional clevis joints are replaced with calibration joints 22*a*-22*c* at three points in the linkage to illustrate embodiments of the innovative calibration joint in a representative operating environment. The calibration joint 22*a* connects the linkage pipe 23 to the Phase-A operating lever 24*a*, the calibration joint 22*b* connects the linkage pipe 23 to the Phase-B operating lever 24*b*, and the calibration joint 22*c* connects the linkage pipe 23 to the Phase-C operating lever 24*c*. In this example, a drive pipe 25 rotates a Phase-B insulator to drive the three-phase linkage 21. Only a portion of the Phase-B switch assembly is shown in FIG. 2 to avoid obstructing the view of the three-phase linkage 21*m* which interconnects the drive pipe 25 with the operating levers 24*a*-24*c*. The operating levers, in turn, rotate respective insulators to open and close the three phase switches of the disconnect switch 20. The calibration joints allow convenient access to independently adjust the positional calibration of each operating lever with respect to the linkage pipe, independently of the other operating levers, so that each operating lever reaches its fully closed position when the linkage pipe reaches its fully closed position. This, in turn, calibrates each phase switch, independently of the other phase switches, so that each phase switch reach its fully closed position when the linkage pipe reaches its fully closed position.

The same linkage pipe 23 drives all three calibration joints 22*a*-22*c*. The Phase-A calibration joint 22*a* allows fine adjustment of the rotational position of the Phase-A operating lever 24*a* with respect to the linkage pipe 23 independent of the rotational positions of the other operating levers 24*b* and 24*c*. The Phase-B calibration joint 22*b* allows fine adjustment of the rotational position of the Phase-B operating lever 24*b* with respect to the linkage pipe 23 independent of the rotational positions of the other operating levers 24*a* and 24*c*. Similarly, the Phase-C calibration joint 22*c* allows fine adjustment of the rotational position of the Phase-C operating lever 24*c* with respect to the linkage pipe 23 independent of the rotational positions of the other operating levers 24*a* and 24*b*. The unique design of the calibration joint provides the technician with convenient access to quickly perform the positional calibration adjustments of the operating levers 24*a*-24*c* with respect to the common linkage pipe 23 to quickly adjust the linkage calibration. This unique calibration joint allows fine adjustment of the blade and jaws of an associated phase switch with respect to the switch actuator independent of the other phase switches. In addition. the calibration joints 22*a*-22*c* are all carried on a common, sturdy linkage pipe 23, which eliminates multiple smaller linkage rods and clevis joints that are more difficult to access and cumbersome to adjust. The calibration joints 22*a*-22*c* are also installed on the common linkage pipe 23 at the same orientation to a technician standing aside the linkage pipe.

Figure 3:
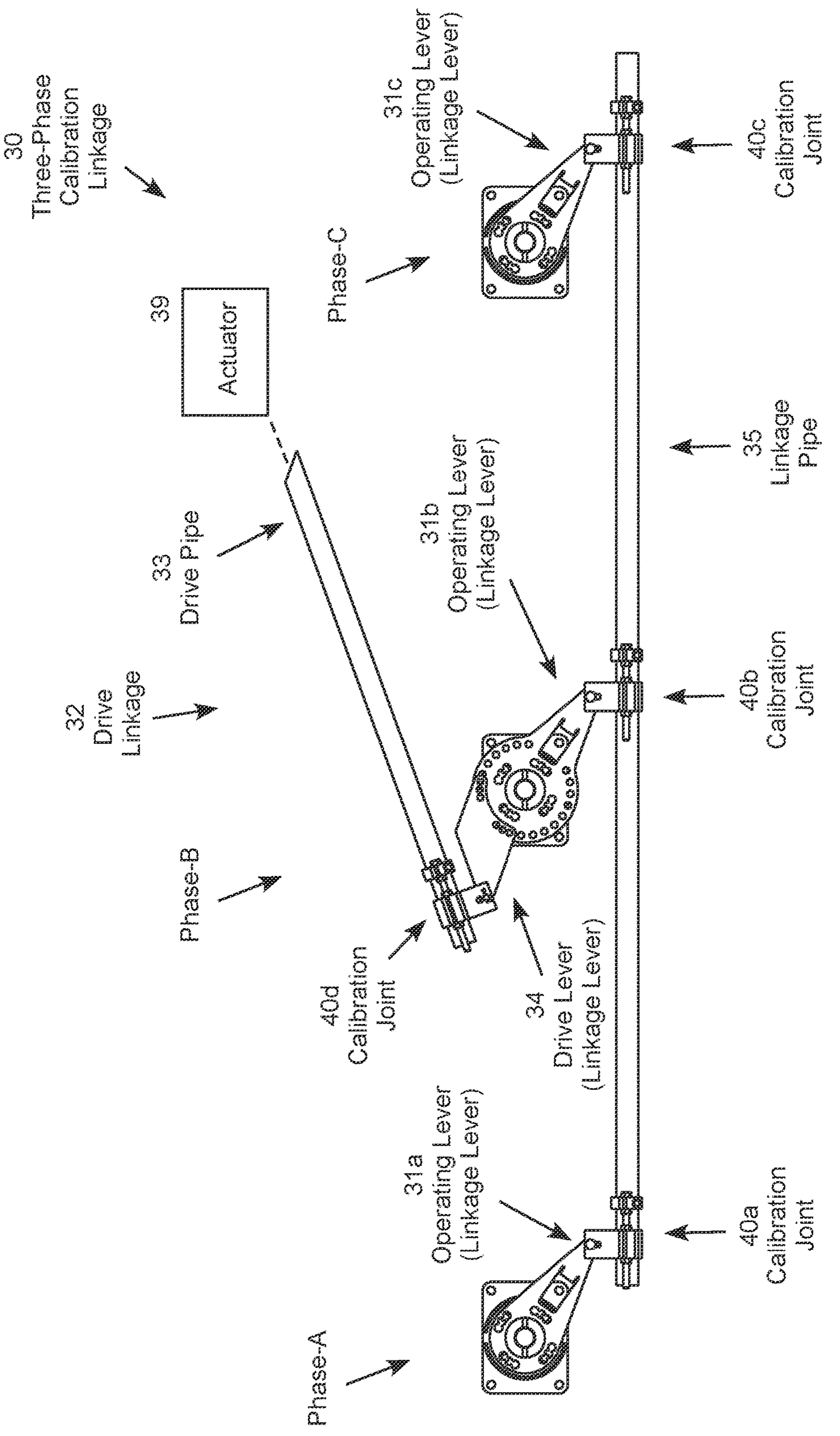
FIG. 3 is a top view of a three-phase calibration linkage.

FIG. 3 is a top view of a representative example of a three-phase calibration linkage 30, which includes four representative calibration joints 40*a*-40*d* at four points in the linkage. The calibration linkage 30 includes a first operating lever 31*a* that rotates a Phase-A insulator, a second operating lever 31*b* that rotates a Phase-B insulator, a third operating lever 31*c* that rotates a Phase-C insulator. The linkage 30 also includes a drive linkage 32 which, in this example, is connected to the operating lever 31*b* for the Phase-B insulator. The drive linkage 32 includes a drive pipe 33 connected to a drive lever 34, which is connected to the operating lever 31*b*. The drive pipe 33 connects to the drive linkage 32 to the switch actuator 39, which is typically by a motor-operated or hand-operated. The actuator 39 moves the drive pipe 33 axially back and forth to open and close the disconnect switch 20.

A linkage pipe 35 interconnects the operating levers 31*a*-31*c* allowing the single drive linkage 32 to simultaneously rotate all insulators (typically two for each phase) to open and close all three phase switches of the disconnect switch. The first calibration joint 40*a* is located at the junction between the linkage pipe 35 and the first operating lever 31*a* for the Phase-A insulator, the second calibration joint 40*b* is located at the junction between the linkage pipe 35 and the second operating lever 31*b* for the Phase-B insulator, the third calibration joint 40*c* is located at the junction between the linkage pipe 35 and the third operating lever 31*c* for the Phase-C insulator, and the fourth calibration joint 40*d* is located at the junction between the drive pipe 33 and the drive lever 34 for the Phase-B insulator.

Figure 4:
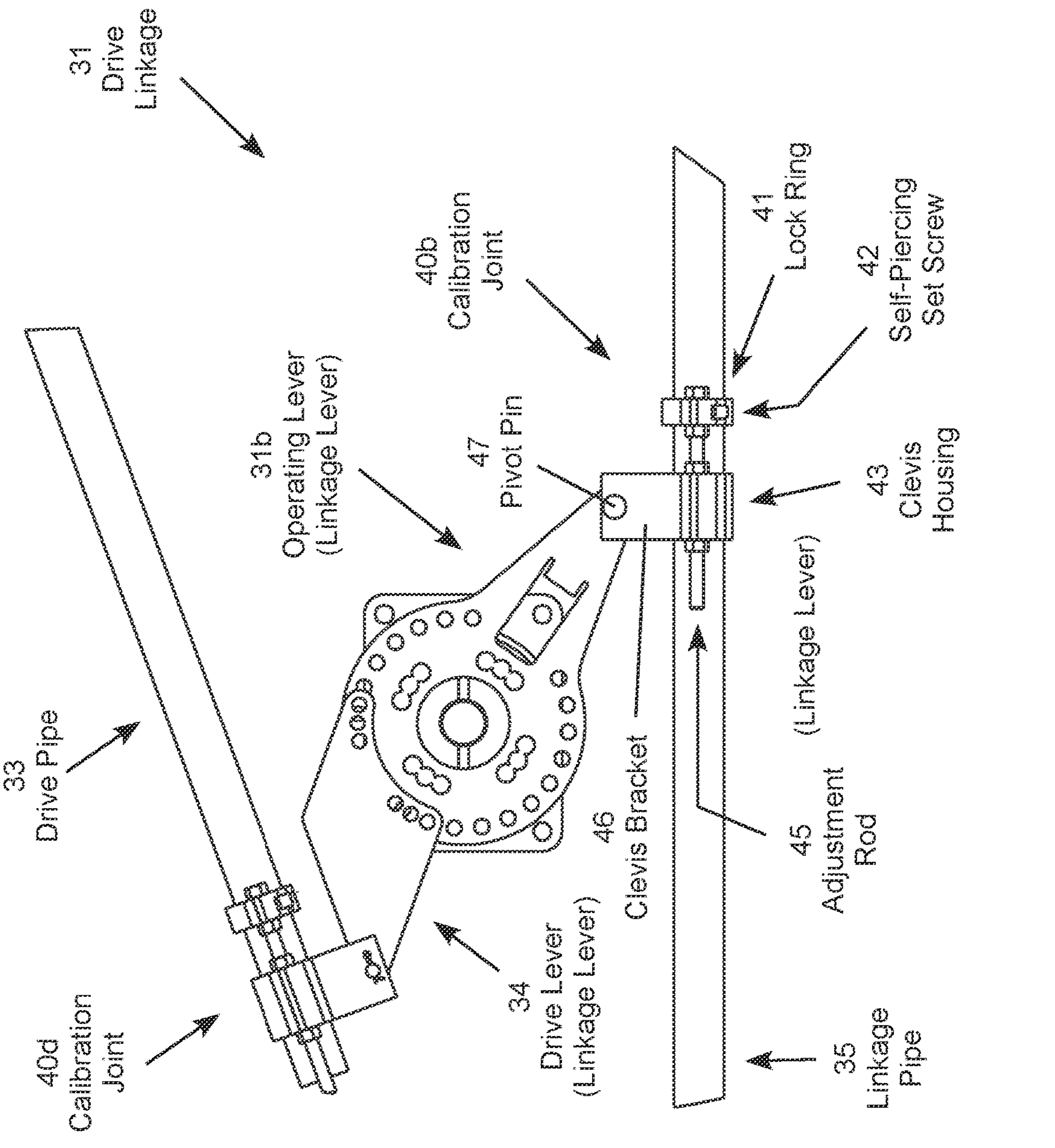
FIG. 4 is a top view of a calibration joint.
Figure 5:
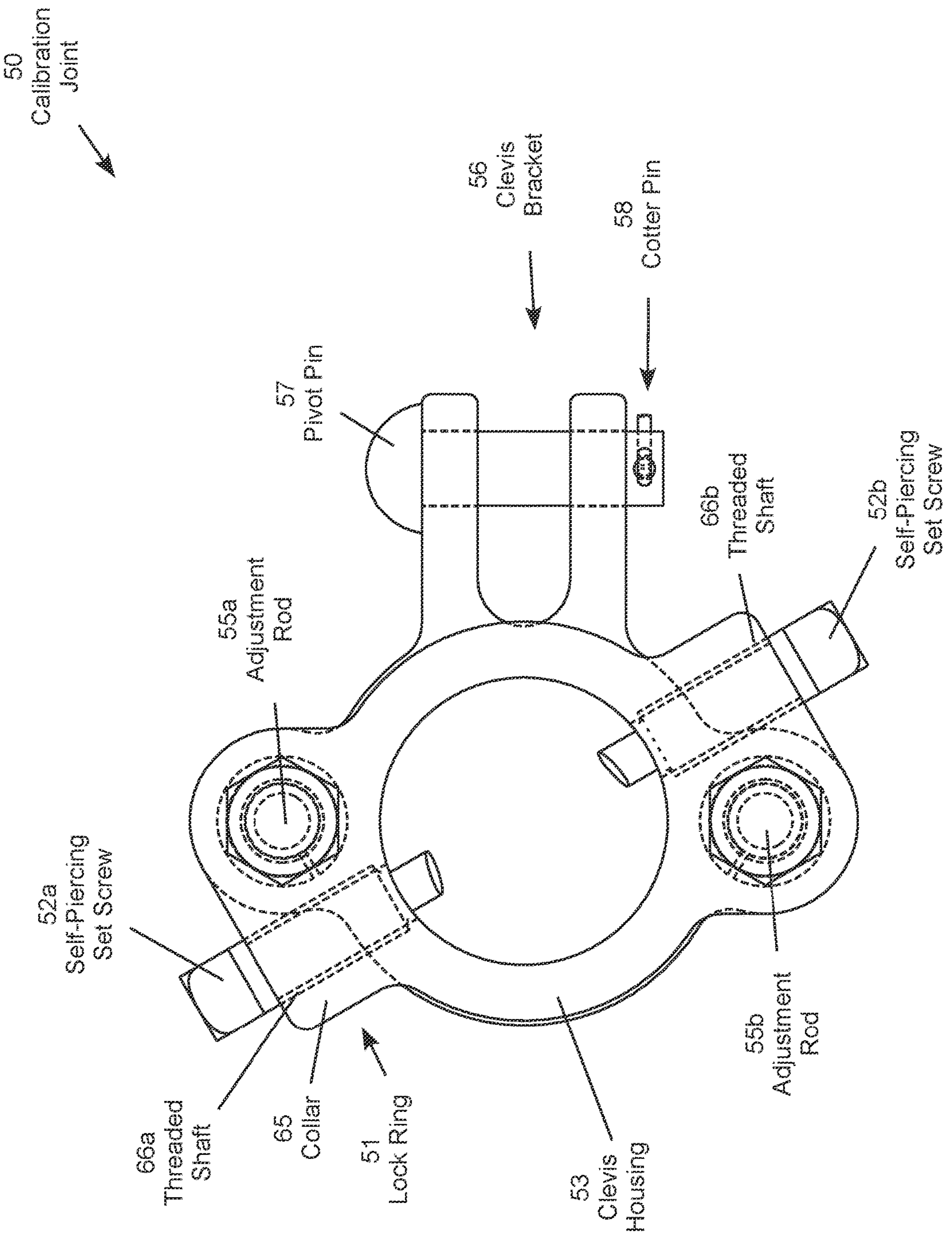
FIG. 5 is an end view of the calibration joint.
Figure 6:
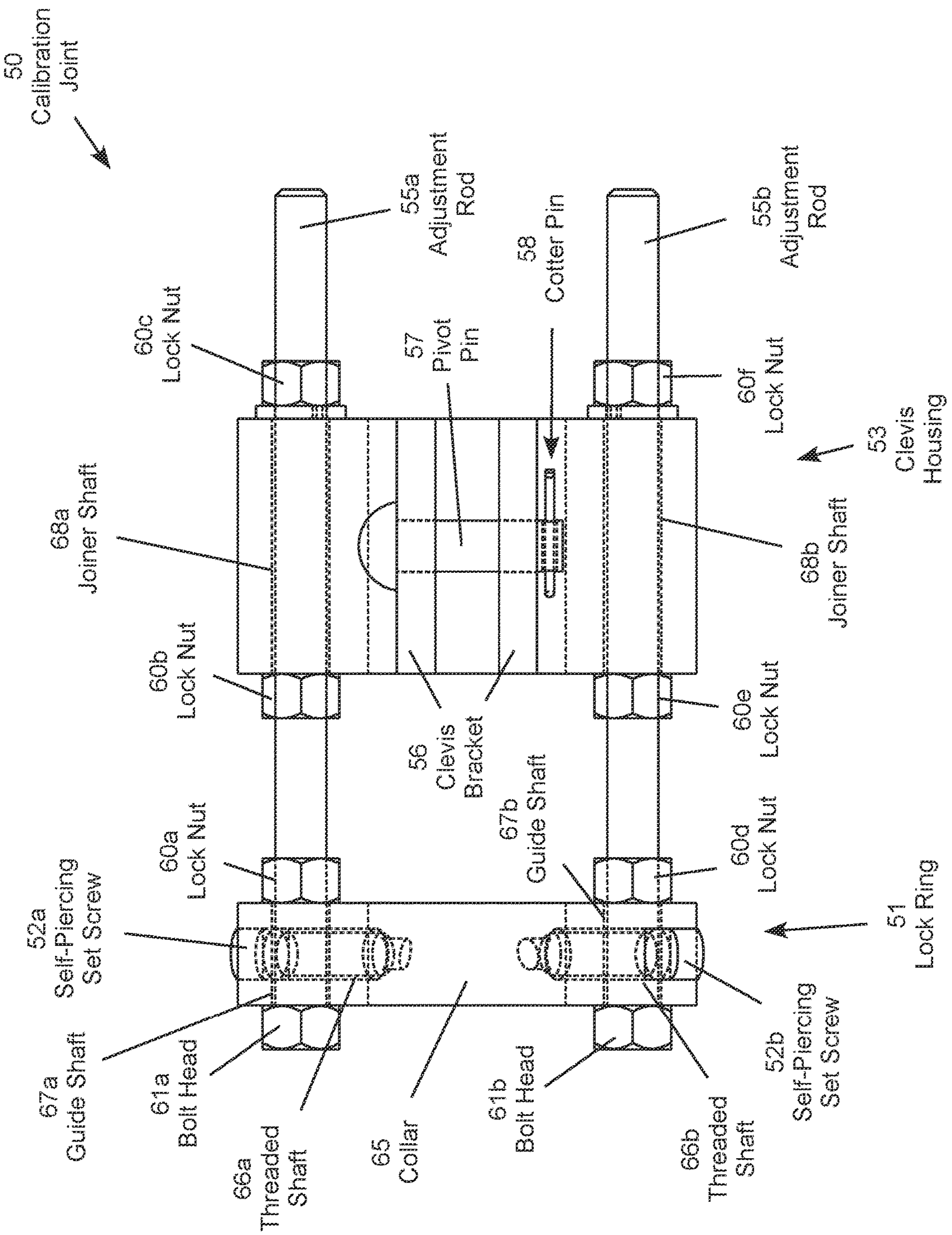
FIG. 6 is a side view of the calibration joint.

FIG. 4 shows an enlarged portion of FIG. 3 showing the connection of the calibration joints 40*b* and 40*d* at the second operating lever 31*b* for the Phase-B insulators that open and close the Phase-B switch. Referring to the calibration joint 40*b* as representative of the calibration joints in general, it includes a lock ring 41 secured to the linkage pipe 35 with a self-piercing set screw 42 (FIG. 5 shows a pair of self-piercing set screws 52*a* and 52*b*). The calibration joint 40*b* also includes a clevis housing 43 that defines a joiner shaft (FIG. 6 shows a pair of joiner shafts 68*a* and 68*b*) that receives an adjustment rod 45 (FIGS. 5 and 6 show a pair of adjustment rods 55*a* and 55*b*) interconnecting the clevis housing 43 to the lock ring 41. The calibration joint 40*b* also defines a clevis bracket 46 that receives a pivot pin 47 connecting the clevis bracket to the operating lever 31*b*.

The lock ring 41 and the clevis housing 43 are captured on the linkage pipe 35, which extends through the lock ring and the clevis housing. While the set screw 42 firmly attaches the lock ring 41 to the linkage pipe 35, the clevis housing 41 is axially "floating" with respect to the linkage pips as the clevis housing itself is not attached to the linkage pipe. The clevis housing 43 is only secured to the linkage pipe 35 by way of the threaded adjustment rod 45, which allows the position of the clevis housing 43 to be axially adjusted with respect to the lock ring 41, and thus with respect to the linkage pipe 35, to finely calibrate the rotational position of the operating lever 31*b* with respect to the axial position of the linkage pipe 35 independently of the other linkage levers. The easily accessible adjustment rod 45 provides a sturdier and more rugged adjustment point that is easier to access and adjust than the adjustment points in a conventional three phase linkage.

FIG. 5 is an end view of the calibration joint 50 in which the linkage pipe (not shown) extends through the clevis housing 53 (into the page in this view). FIG. 6 is a side view of the calibration joint 50 in which the linkage pipe (not shown) extends through the clevis housing 53 (horizontal in this view). The calibration joint 50 includes a lock ring 51, which includes a collar 65 shaped to receive the linkage pipe. The collar includes a pair of threaded shafts 66*a*-66*b* for receiving respective self-piercing set screws 52*a* and 52*b*. The self-piercing set screws are tightened to extend from the threaded shafts into the linkage pipe to secure to the lock ring to the linkage pipe. The collar 65 also includes a pair of axial guide shafts (FIG. 6 shows the axial guide shafts 67*a*-67*b*) receiving threaded adjustment rods 55*a* and 55*b*.

The calibration joint 50 also includes a clevis housing 53 that defines a pair of axial joiner shafts (FIG. 6 shows two axial joiner shafts 68*a* and 68*b*) that receive the adjustment rods 55*a* and 55*b*, respectively, interconnecting the clevis housing 53 to the lock ring 51. The clevis housing 53 also defines a clevis bracket 56 that receives a pivot pin 57 for connecting the clevis bracket to a linkage lever. A cotter pin 58 captures the pivot pin 57 on the clevis bracket 56. Lock nuts 60*a*-60*f* and bolt heads 61*a*-61*b* (or end nuts) provide easy access for adjusting the axial position of the clevis housing 53 with respect to the lock ring 51. This, in turn, allows fine adjustment of the rotational position of the linkage lever connected to the clevis bracket 56 with respect to the axial position of the linkage pipe extending though the clevis housing 53 and the lock ring 51. Through additional linkage connections, the calibration joint 50 allows fine adjustment of the blade and jaws of an associated phase switch with respect to the switch actuator independent of the other phase switches.

The calibration joint linkage itself is not tied to any particular switch configuration and may be employed with any suitable three-phase linkage. In view of the foregoing, it will be appreciated that present invention provides significant improvements distribution automation system for high voltage electric power transmission and distribution systems. The foregoing relates only to the exemplary embodiments of the present invention, and numerous changes may be made therein without departing from the spirit and scope of the invention as defined by the following claims.

The invention claimed is:

1. A calibration linkage for a three-phase electric disconnect switch comprising:
- a drive lever connected to an actuator for driving the disconnect switch;
- a drive pipe;
- a first calibration joint connecting the drive lever with the drive pipe comprising a first lock ring secured to the drive pipe and a first clevis housing floating on the drive pipe connected to the first lock ring by a first adjustment rod allowing positional adjustment of the first clevis housing with respect to the drive pipe;
- an operating lever connected to a phase switch of the disconnect switch for opening and closing the phase switch;
- a linkage pipe;
- a second calibration joint connecting the operating lever with the linkage pipe comprising a second lock ring secured to the linkage pipe and a second clevis housing floating on the linkage pipe connected to the second lock ring by a second adjustment rod allowing positional adjustment of the second clevis housing with respect to the linkage pipe.

2. The calibration joint of claim 1, wherein axial adjustment of the first clevis housing with respect to the first lock ring allows rotational adjustment a linkage lever of the disconnect switch with respect to an axial position of the linkage pipe.

3. The calibration joint of claim 2, wherein:
- the linkage lever of the disconnect switch rotates an insulator to open and close a phase switch of the disconnect switch;
- axial adjustment of the first clevis housing with respect to the first lock ring allows rotational adjustment of the insulator with respect to an axial position of the linkage pipe.

4. The calibration joint of claim 1, wherein the first lock ring further comprises a threaded shaft and a self-piercing set screw extending from the threaded shaft into the linkage pipe securing the lock ring to the linkage pipe.

5. The calibration joint of claim 1, wherein:
- the first lock ring further comprises an axial guide shaft;
- the first clevis housing further comprises an axial joiner shaft;
- further comprising an adjustment rod extending through the axial guide shaft, through the axial joiner shaft, and engaging with lock nuts allowing axial adjustment of the first clevis housing with respect to the first lock ring.

6. The calibration joint of claim 2, further comprising a clevis bracket securing the first clevis housing to the linkage lever and a pivot pin connecting the first clevis bracket to the operating lever.

7. The calibration joint of claim 6, further comprising a cotter pin capturing the pivot pin on the first clevis bracket.

8. The calibration joint of claim 1, wherein:

the first calibration joint links the drive pipe to a phase-A operating lever driving a phase-A switch of the three-phase electric disconnect switch;

the second calibration joint links the drive pipe to a phase-B operating lever driving a phase-B switch of the three-phase electric disconnect switch.

9. The calibration joint of claim 8, further comprising a third calibration joint linking the drive pipe to a phase-C operating lever driving a phase-C switch of the three-phase electric disconnect switch.

10. The calibration joint of claim 9, wherein:

the phase-A operating lever rotates a phase-A insulator to open and close the phase-A switch of the disconnect switch, and the phase-A calibration joint allows rotational adjustment of the phase-A insulator with respect to an axial position of the linkage pipe;

the phase-B operating lever rotates a phase-B insulator to open and close the phase-B switch of the disconnect switch, and the phase-B calibration joint allows rotational adjustment of the phase-B insulator with respect to the axial position of the linkage pipe;

the phase-C operating lever rotates a phase-C insulator to open and close the phase-C switch of the disconnect switch, and the phase-C calibration joint allows rotational adjustment of the phase-C insulator with respect to the axial position of the linkage pipe.

* * * * *